(12) United States Patent
Sauer et al.

(10) Patent No.: US 8,567,995 B2
(45) Date of Patent: *Oct. 29, 2013

(54) COMPUTING DEVICES HAVING ADJUSTABLE KEYBOARD LIGHTS

(75) Inventors: Keith A. Sauer, Spring, TX (US); Paul J. Doczy, Cypress, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/867,877

(22) PCT Filed: Mar. 19, 2008

(86) PCT No.: PCT/US2008/057445
§ 371 (c)(1),
(2), (4) Date: Aug. 16, 2010

(87) PCT Pub. No.: WO2009/116996
PCT Pub. Date: Sep. 24, 2009

(65) Prior Publication Data
US 2011/0007492 A1    Jan. 13, 2011

(51) Int. Cl.
*F21V 21/30* (2006.01)
(52) U.S. Cl.
USPC ............................ 362/287; 362/285; 362/271
(58) Field of Classification Search
USPC .................................. 362/287, 285, 271, 269
See application file for complete search history.

(56) References Cited

U.S. PATENT DOCUMENTS

| | | | |
|---|---|---|---|
| 6,040,822 A | 3/2000 | Decker | |
| 6,161,944 A | 12/2000 | Leman | |
| 6,380,921 B2 | 4/2002 | Nakamura | |
| 7,686,466 B2 * | 3/2010 | Lev et al. ...................... | 362/23 |
| 2002/0064055 A1 | 5/2002 | Takahashi et al. | |
| 2002/0085371 A1 | 7/2002 | Katayama et al. | |
| 2004/0062033 A1 | 4/2004 | Chu-Chia et al. | |
| 2007/0253182 A1 | 11/2007 | Motai et al. | |

FOREIGN PATENT DOCUMENTS

| | | |
|---|---|---|
| CN | 1359484 A | 7/2002 |
| JP | S59-4493 | 1/1984 |
| JP | 11-283440 A1 | 10/1999 |
| JP | 2005-011096 A | 1/2005 |
| WO | WO-2007/008501 A2 | 1/2007 |

OTHER PUBLICATIONS

International Searching Authority, International Search Report and Written Opinion dated Nov. 26, 2008, pp. 9.
DE Office Action, Appln No. 112008003775.2, date of mailing Feb. 10, 2011, pp. 4.
Translation of DE Office Action, Appln No. 112008003775.2, date of mailing Feb. 10, 2011, pp. 3.

\* cited by examiner

*Primary Examiner* — Mary Ellen Bowman

(57) ABSTRACT

An adjustable keyboard light including a light module that includes an internal light source, a retaining member that retains the light module in an initial closed position, and a release button that releases the light module such that the module can pivot outwardly to one of multiple open positions, the light module having a different orientation at each open position.

24 Claims, 5 Drawing Sheets

COMPUTING DEVICES HAVING ADJUSTABLE KEYBOARD LIGHTS

BACKGROUND

It can be difficult to see the keyboard of a computing device in low light conditions. That difficulty can be exacerbated by the light emitted by the computer display. In particular, the display illuminates the computer user's eyes and therefore limits the extent to which the user's eyes can dilate to collect ambient light.

Although a light can be provided on the display portion of the computing device down to illuminate the keyboard, such a light may only be effective when the display portion of the computing device is positioned at a particular angle relative to the keyboard. In particular, if the light is not adjustable, it cannot be placed in an orientation that accounts for the angle formed between the display portion and the keyboard. As a result, the emitted light may miss all or a portion of the keyboard, or worse, may shine in the user's eyes.

BRIEF DESCRIPTION OF THE DRAWINGS

The disclosed computing devices can be better understood with reference to the following drawings. The components in the drawings are not necessarily to scale.

DETAILED DESCRIPTION

As described above, although a light can be provided on the display portion of a computing device for the purpose of illuminating a keyboard of the computing device, the light may only be effective when the display portion is placed in a particular orientation (e.g., angle) relative to the keyboard. As described in the following, however, the effectiveness of such a light can be improved when the light is adjustable. In such a case, the orientation of the light can be adjusted relative to the orientation of the display portion to ensure that the light shines directly on the keyboard keys.

Figure 1:
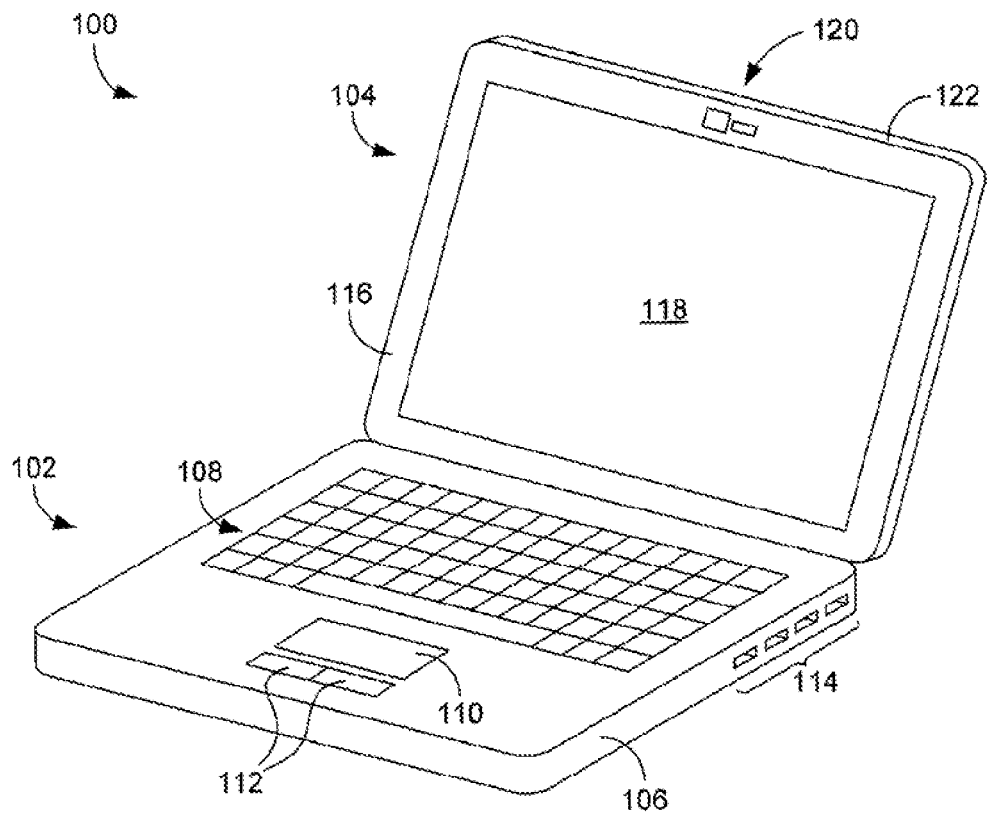
FIG. 1 is a perspective view of an embodiment of a computing device having an adjustable keyboard light.

Referring now in more detail to the drawings in which like numerals indicate corresponding parts throughout the views, FIG. 1 illustrates a computing device 100 in the form of a notebook or "laptop" computer. Although a notebook computer has been explicitly illustrated and identified, it is noted that the notebook computer is cited only as an example. Therefore, the teachings of the present disclosure may also apply to other computing devices, such as desktop computers.

As indicated in FIG. 1, the computing device 100 includes a base portion 102 and a display portion 104 that are attached to each other with a hinge mechanism (not shown). The base portion 102 includes an outer housing 106 that surrounds various internal components of the computing device 100, such as a processor, memory, hard drive, and the like. Also included in the base portion 102 are user input devices, including a keyboard 108, a mouse pad 110, and selection buttons 112, as well as various ports or connectors 114 that are accessible through the housing 106. The display portion 102 includes its own outer housing 116. Provided within the housing 116 is a display 118, such as a liquid crystal display (LCD).

As is further depicted in FIG. 1, the display portion 104 includes an adjustable keyboard light, which is generally identified by reference numeral 120. As is apparent from FIG. 1, the keyboard light 120 is integrated into the housing 116 adjacent the top edge 122 of the display portion 104.

Figure 2:
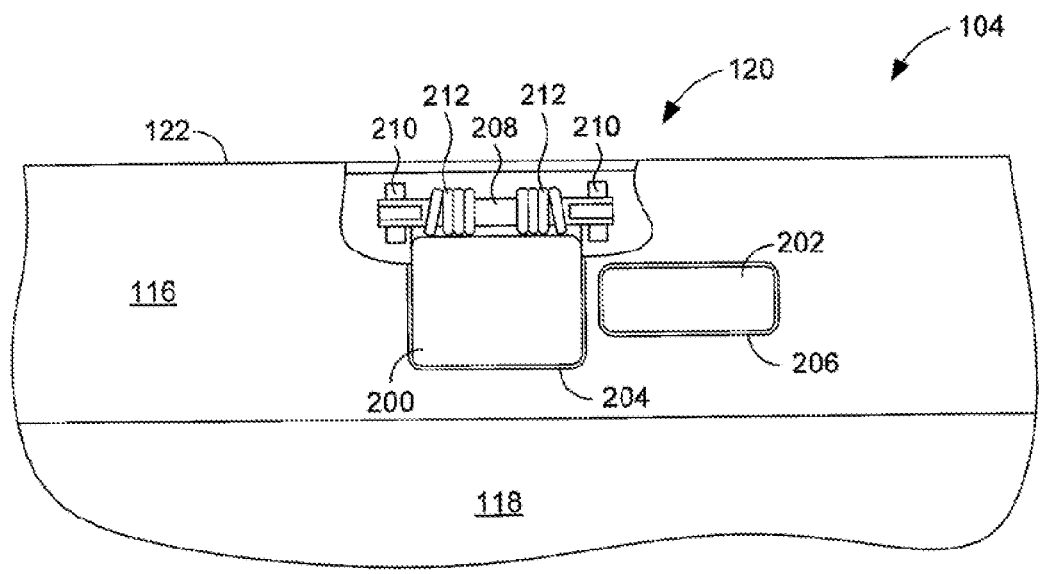
FIG. 2 is a partial cut-away view of a display portion of the computing device of FIG. 1, illustrating the keyboard light in greater detail.

FIG. 2 illustrates the keyboard light 120 in greater detail. As indicated in FIG. 2, the keyboard light 120 comprises a pop-up light module 200 and a release button 202 that both extend out from the housing 116 through openings 204 and 206 formed therein. As is further indicated in FIG. 2, the module 200 includes a pivot axle 208 that is pivotally supported by brackets 210 located within the housing 116. Surrounding the pivot axle 208 are one or more light module springs 212 that urge the module 200 toward an open or extended position. By way of example, the springs 212 are torsion springs. As described in more detail below, the springs 212 cause the module 200 to pop up or out from the housing 116 when a mechanism that retains the module is released when the release button 202 is depressed.

Figure 3:
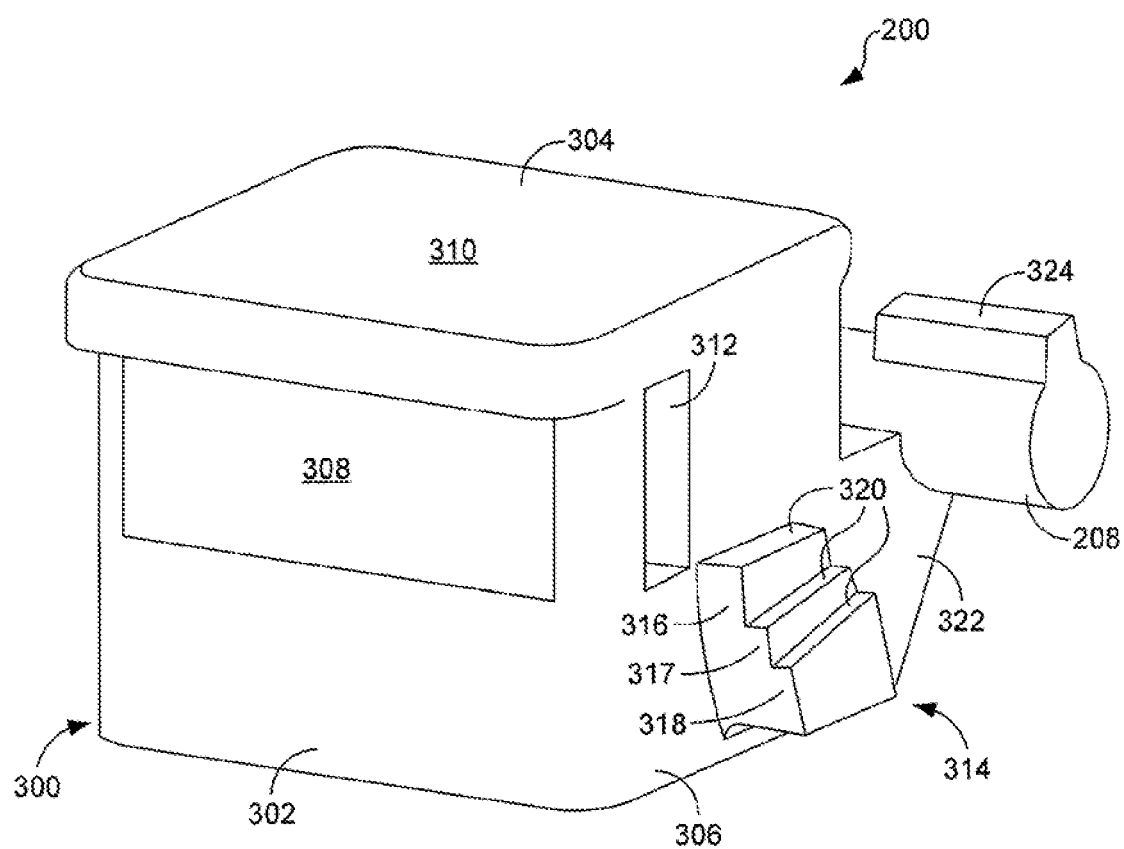
FIG. 3 is a perspective view of a pop-up light module of the keyboard light shown in FIG. 2.

FIG. 3 illustrates the pop-up light module 200 in greater detail. As indicated in FIG. 3, the module 200 comprises a generally rectangular housing 300 that includes a front side 302, a top side 304, and lateral sides 306 (only one lateral sides visible in FIG. 3). Provided on the front side 302 is a light window 308 through which shines light emitted by an internal light source (not shown). By way of example, the internal light source comprises a white light emitting diode (LED). The top side 304 forms a top or outer surface 310 of the module 200. When the module 200 is in an initial closed position, the outer surface 310 is generally flush with the outer surface of the display portion housing 116 (FIG. 2). Formed through in lateral sides 306 are ventilation openings 312 through which heat generated by the internal light source can escape during use. Provided on one of the lateral sides 306 adjacent the ventilation opening 312 is a ratchet element 314. In the illustrated embodiment, the ratchet element 314 comprises multiple steps 316, 317, and 318, each comprising a top face 320. As is described in greater detail below, the steps 316, 317, and 318 are used to control a orientation of the module 200. More particularly, the steps 316, 317, and 318 are used to control a pivot angle of the module 200, which controls the angle at which light is emitted from the display portion 104.

With further reference to FIG. 3, the pop-up light module 200 also includes an axle connection portion 322 that connects the housing 300 to the pivot axle 208. As indicated in FIG. 3, the pivot axle 208 comprises a stop member 324 that limits pivoting of the axle and, therefore, the module 200. In some embodiments, two such stop members 324 are provided, one at each end of the pivot axle 208.

Figure 4A:
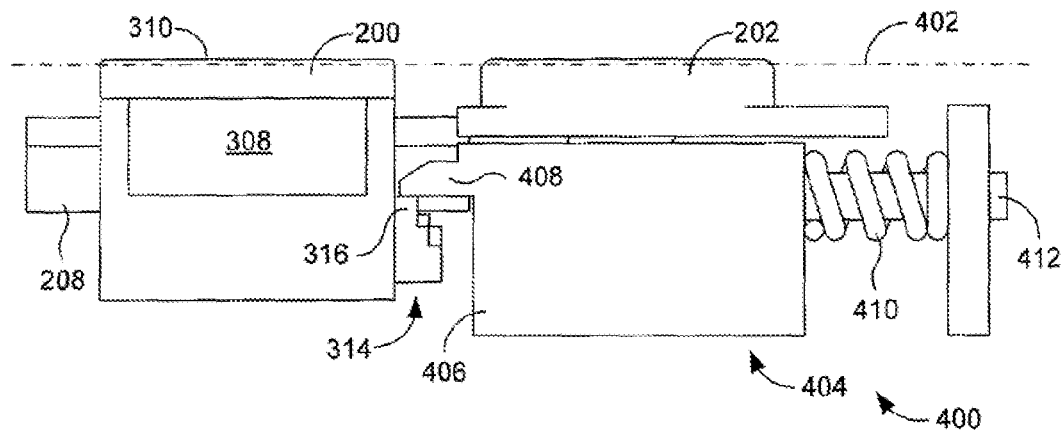
FIGS. 4A-4C are side views of the pop-up light module of FIG. 3 and a control mechanism that is used to control the orientation of the pop-up light module, the figures depicting transition of the pop-up light module from an initial closed position to a first open position.
Figure 4B:
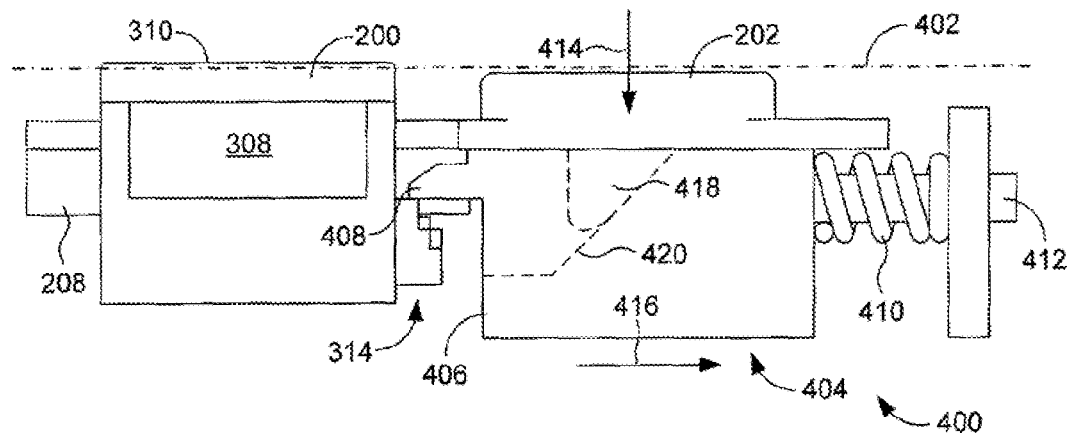
Figure 4C:
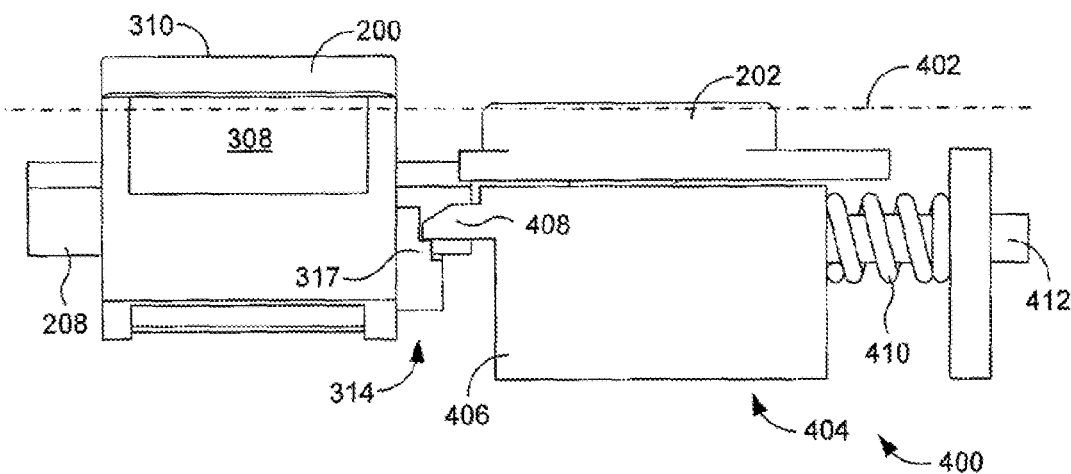
Figure 5A:
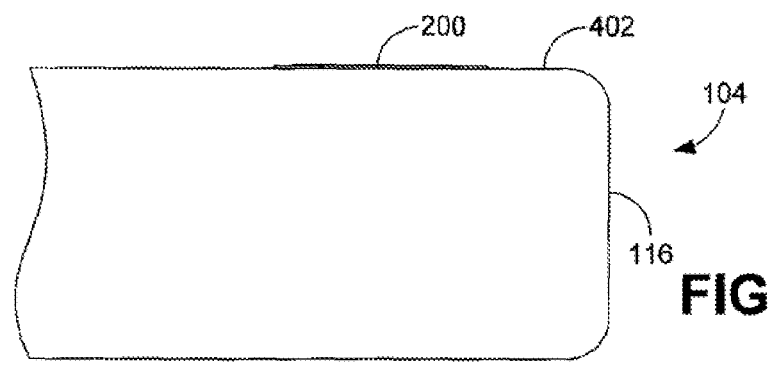
FIGS. 5A-5D are partial side views of the display portion of the computing device of FIG. 1, illustrating the pop-up light module in various orientations.
Figure 5B:
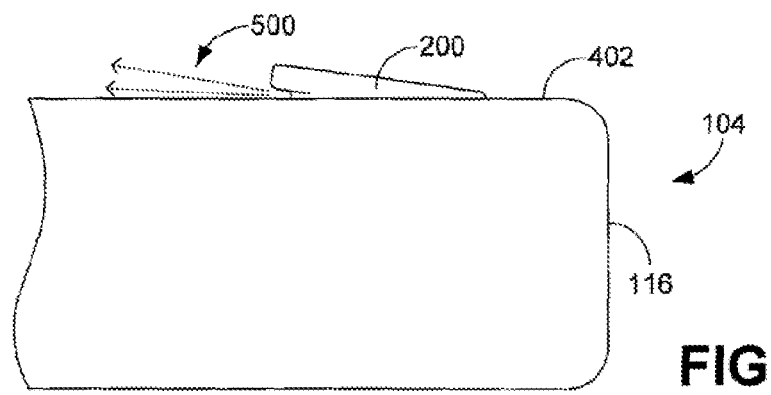
Figure 5C:
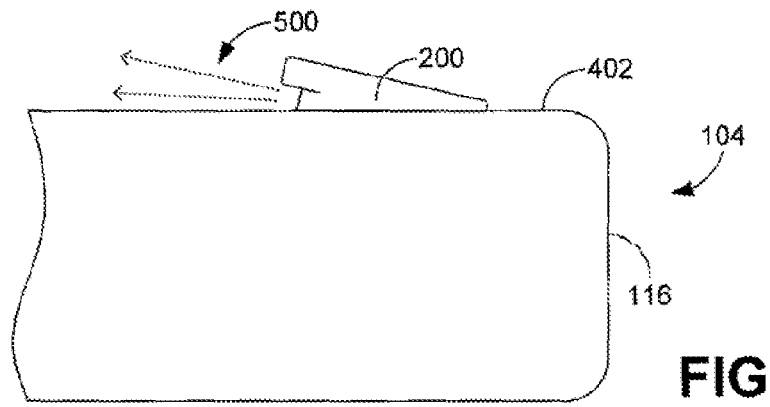
Figure 5D:
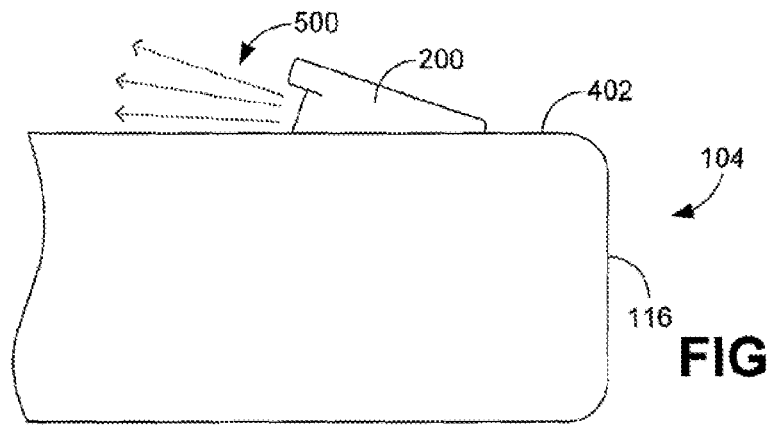

FIGS. 4A-4C illustrate the pop-up light module 200 and a control mechanism 400 that is used to control the orientation of the module. In FIGS. 4A-4C, the outer surface of the display device housing 116 in which the keyboard light 120 is provided is identified by broken line 402.

Beginning with FIG. 4A, the pop-up light module 200 is shown in an initial closed position in which the outer surface 310 of the module is substantially flush with the outer surface 402 of the housing 116. As described above, one or more springs 212 provided on the pivot axle 208 urge the module 200 toward an open or extended position (FIG. 2). However, the module 200 is held in the closed position shown in FIG. 4A due to a retaining member 404. In the embodiment of FIGS. 4A-4C, the retaining member 404 comprises a block 406 from which laterally extends a retaining tab 408 that acts as a pawl to the module's ratchet element 314. Therefore, the retaining tab 408 prevents pivoting of the module 200 when the retaining tab interferes with movement of the ratchet element 314. When the module 200 is in the closed position shown in FIG. 4A, the retaining tab 408 contacts the top face 320 of the first step 316, thereby preventing the ratchet element 314 from moving in the upward direction (in the orientation of FIG. 4A), which therefore prevents pivoting of the module 200.

Pivoting of the module 200 is possible, however, when the retaining tab 408 is moved out of the way of the first step 316. Such movement is effected when the user depresses the release button 202. In particular, as shown in FIG. 4B, depression of the release button 202 causes the retaining member 404 to move in a lateral direction away from the module 200 again the force of a retaining member spring 410 that is provided on a shaft 412 that extends from the block 406. In some embodiments, downward (in the orientation of FIG. 4B) movement of the release button 202 identified by direction arrow 414 is translated into lateral movement of the retaining member 404 identified by direction arrow 416 due to interaction of an a cam member 418 of the button and a cam surface 420 of the block 420, both of which are shown in FIG. 4B with hidden lines. As indicated in FIG. 4B, both the cam member 418 and the cam surface 420 are sloped such that the farther down the release button 202 is depressed, the farther the retaining member 404 is laterally displaced.

The interaction between the release button 202 and the retaining member 404 described above can be used to open or extend the pop-up light module 200 so that its light can shine on the keyboard 108 (FIG. 1). For example, when the release button 202 is depressed to the point at which the retaining tab 408 is moved out of contact with the top face 320 of the first step 316, the module 200 will pivot outward from the housing 116 about its pivot axle 208 under the force of the one or more torsion springs 212 (FIG. 2). Assuming that the retaining tab 408 has not been moved far beyond the point at which contact with the first step 316 was lost, the tab will then contact the top surface 320 of the second step 317, as shown in FIG. 4C. In FIG. 4C, the module 200 is oriented in a first open position in which the module extends beyond the outer surface 402 of the housing 116 and can therefore shine light out from the housing. Further pivoting of the module 200 is impeded, however, due to contact between the retaining tab 408 and the second step 217.

As can be appreciated from the above, the retaining member 404 can be further displaced by the release button 202 to move the retaining tab 408 into contact with the third step 218 to effect a second open position of the pop-up light module 200. In some embodiments, the retaining member 404 can be further displaced so as to move the retaining tab 408 beyond third step 218, at which point the stop members 324 provided on the pivot axle 208 will abut their respective brackets 210 to limit further pivoting of module 200. At that point, a third open position of the module 200 can be effected.

FIGS. 5A-5D respectively illustrate the closed, first open, second open, and third open positions of the pop-up light module 200. Beginning with FIG. 5A, the module 200 is, as mentioned above, substantially flush with the outer surface 402 of the display portion housing 116 when in the closed position. In the first open position shown in FIG. 5B, however, the module 200 has been pivoted about its pivot axle 208 so as to form a relatively shallow angle with the outer surface 402 such that light rays 500 may be directed at the keyboard 108 (FIG. 1). By way of example, that angle is approximately 8 degrees. In the second open position shown in FIG. 5C, a greater angle is formed between the module 200 and the outer surface 402. By way of example, that angle is approximately 13 degrees. Finally, in the third open position shown in FIG. 5D, the module 200 forms an angle of about 18 degrees with the outer surface 402.

As can be appreciated from FIGS. 5A-5D, the position of the pop-up light module 200 (i.e., the orientation of the keyboard light 120) can be selectively adjusted by the user to control the angle at which light is emitted and ensure that light hits the keyboard 108. Therefore, irrespective of whether the display portion 104 forms a relatively small angle or a relatively large angle with the base portion 102 that houses the keyboard 108, the keyboard light 120 can be adjusted to ensure it is effective at illuminating the keys of the keyboard.

Although opening or extension of the pop-up light module 200 has been described above as a stepwise process in which the module is sequentially opened step-by-step to a greater and greater extent, it is noted that the module can, alternatively, be opened from the initial closed position directly to its greatest extent (i.e., the third open position described above) by full depression of the release button 202. In such a case, the module 200 can be manually pivoted inward, for example in a stepwise manner, by the user to reduce the angle at which light is emitted, if desired. For example, if the user opens the module 200 to the third open position but the light "overshoots" the keyboard 108 (e.g. because the display portion 104 has been opened to a wide angle relative to the base portion 102), the user can press the module inward into the housing 116 to place the module 200 in the second open position. In such a case, the retaining tab 408 will snap into contact with the top surface 320 of the third step 318 under the force of the spring 410. If the user finds that the light still overshoots the keyboard 108, the user can then again press the module 200 inward to place it in the first open position in which the retaining tab 408 contacts the top surface 320 of the second step (see FIG. 4C). Regardless of which position the user prefers, the module 200 can be placed back in the initial closed position by pressing the module all the way back into the housing 116, at which point the retaining tab 408 will again contact the top surface 320 of the first step 316 (see FIG. 4A).

Figure 6:
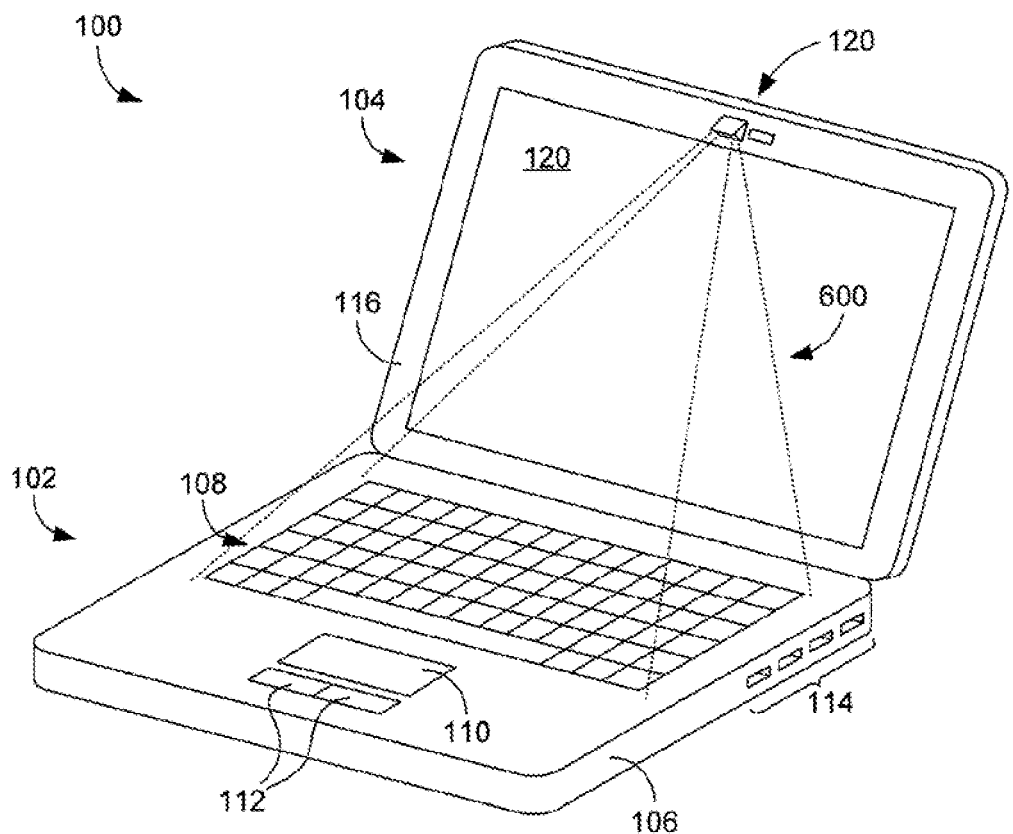
FIG. 6 is a further perspective view of the computing device of FIG. 1, illustrating use of the adjustable keyboard light.

FIG. 6 illustrates the keyboard light 120 in use in illuminating the keyboard 108 of the computing device 100. As indicated in FIG. 6, light 600 emitted from the keyboard light 120 is spread across the entire keyboard 108.

The invention claimed is:
1. An adjustable keyboard light comprising:
   a light module that includes an internal light source;
   a retaining member that retains the light module in an initial closed position; and
   a release button that releases the light module such that the module can pivot outwardly to one of multiple open positions, the light module having a different orientation at each open position.
2. The keyboard light of claim 1, wherein the light module comprises a pivot axle about which it pivots to reach an open position.
3. The keyboard light of claim 1, wherein the light module comprise a ratchet element with which the retaining member interacts.

4. The keyboard light of claim 3, wherein the ratchet element comprises multiple steps, each step being associated with a different orientation of the light module.

5. The keyboard light of claim 4, wherein the retaining member includes a retaining tab that contacts the steps of the ratchet mechanism, wherein that contact retains the light module in the orientation associated with each step.

6. The keyboard light of claim 1, wherein the release button comprises a cam member and the retaining member comprises a cam surface and wherein depression of the release button forces the cam member against the cam surface to laterally displace the retaining member.

7. The keyboard light of claim 1, further comprising a light module spring that urges the light module toward an open position.

8. The keyboard light of claim 1, further comprising a retaining member spring that urges the retaining member into contact with the light module.

9. The keyboard light of claim 1, further comprising a stop member provided on the light module that limits pivoting of the light module.

10. An adjustable keyboard light adapted for integration into a housing of a display portion of a computing device, the keyboard light comprising:
a light module that includes an internal light source and a pivot axle about which the light module can pivot to move from an initial closed position in which the light module is positioned within the housing to one of multiple open positions in which the light module extends from the housing, the light module further including a ratchet element having multiple steps, each step being associated with a different light module orientation;
a light module spring that acts upon the light module to urge it toward an open position; a retaining member that controls the orientation of the light module, the retaining member including a retaining tab that contacts the steps of the ratchet element, the step that the retaining tab contacts determining the orientation of the light module;
a retaining member spring that urges the retaining member into contact with the light module so that the retaining tab contacts one of the steps of the ratchet element; and
a release button that moves the retaining member out of contact with the light module against the force of the retaining member spring.

11. The keyboard light of claim 10, wherein the release button comprises a cam member and the retaining member comprises a cam surface and wherein depression of the release button forces the cam member against the cam surface to laterally displace the retaining member.

12. The keyboard light of claim 10, further comprising a stop member provided on the pivot axle that limits pivoting of the light module.

13. The keyboard light of claim 10, wherein the light module can be placed in three open positions, the light module forming a different angle with the housing at each of the three open positions.

14. The keyboard light of claim 13, wherein the angles are approximately 8, 13, and 18 degrees.

15. A computing device comprising:
a base portion that includes a keyboard;
a display portion that includes a display provided within an outer housing; and
an adjustable keyboard light that is mounted to the outer housing, the keyboard light including a light module that includes an internal light source, a retaining member that retains the light module in an initial closed position in which the light module is substantially flush with the outer housing, and a release button that releases the light module such that the module can pivot outwardly from the outer housing to one of multiple open positions, the light module forming a different angle with the outer housing at each open position.

16. The computing device of claim 15, wherein the light module comprises a pivot axle about which it pivots to reach an open position.

17. The computing device of claim 15, wherein the light module comprises a ratchet element with which the retaining member interacts.

18. The computing device of claim 15, wherein the ratchet element comprises multiple steps, each step being associated with a different orientation of the light module.

19. The computing device of claim 15, wherein the retaining member includes a retaining tab that contacts the steps of the ratchet mechanism, wherein that contact retains the light module in the orientation associated with each step.

20. The computing device of claim 15, wherein the release button comprises a cam member and the retaining member comprises a cam surface and wherein depression of the release button forces the cam member against the cam surface to laterally displace the retaining member.

21. The computing device of claim 15, further comprising a light module spring that urges the light module toward an open position.

22. The computing device of claim 15, further comprising a retaining member spring that urges the retaining member into contact with the light module.

23. The computing device of claim 15, further comprising a stop member provided on the light module that limits outward pivoting of the light module.

24. The computing device of claim 15, wherein the computing device is a notebook computer.

\* \* \* \* \*